United States Patent [19]

Ono et al.

[11] E Patent Number: Re. 33,711

[45] Reissued Date of Patent: Oct. 8, 1991

[54] RATCHET WRENCH

[75] Inventors: Akira Ono, Hatoyama; Toshiro Iritani, Sagamihara, both of Japan

[73] Assignee: Ingersoll-Rand Company, Woodcliff lake, N.J.

[21] Appl. No.: 578,363

[22] Filed: Sep. 4, 1990

Related U.S. Patent Documents

Reissue of:

[64] Patent No.: 4,919,022
Issued: Apr. 24, 1990
Appl. No.: 363,419
Filed: Jun. 5, 1989

U.S. Applications:

[63] Continuation of Ser. No. 188,143, Apr. 29, 1988, abandoned, which is a continuation of Ser. No. 861,540, May 9, 1986, abandoned.

[30] Foreign Application Priority Data

May 15, 1985 [JP] Japan ..... 60-103158

[51] Int. Cl.[5] ..... B25B 19/00

[52] U.S. Cl. ..... 81/464; 173/93.5

[58] Field of Search ..... 81/463–466, 81/473, 475, 57.13, 57.39; 173/93, 93.5, 93.6

[56] References Cited

U.S. PATENT DOCUMENTS

| | | | |
|---|---|---|---|
| 3,212,590 | 10/1965 | Hoza et al. | 81/464 |
| 3,414,066 | 12/1968 | Wallace | 173/93.6 |
| 3,428,137 | 2/1969 | Schoedler et al. | 173/93.6 |
| 4,063,601 | 12/1977 | Biek | 173/93.6 |
| 4,184,552 | 1/1980 | Anderson | 173/93.5 |
| 4,346,630 | 8/1982 | Hanson | 81/57.39 |
| 4,382,476 | 5/1983 | Swenson | 81/466 X |

*Primary Examiner*—James G. Smith
*Attorney, Agent, or Firm*—Walter C. Vliet; Robert F. Palermo; Arthur N. Trausch

[57] ABSTRACT

The powered ratchet wrench 10 is constructed of several components. A throttle lever 20 controls the air flow to a rotary air motor 30. The rotary output of the motor is transmitted to the hammer assembly 40 of an impact clutch mechanism. A spring 50 biases an anvil shaft 60 into association with the hammer assembly 40. The anvil can be directly driven by the motor through the hammer assembly or can be driven intermittently by a series of rotational impacts from the hammer assembly. The rotation of the anvil shaft causes the reversible ratchet mechanism 70 to rotate in the desired direction, thus tightening or removing a threaded fastener. Only a small reaction force is transmitted by the tool to the operator once the fastener is tightened.

6 Claims, 1 Drawing Sheet

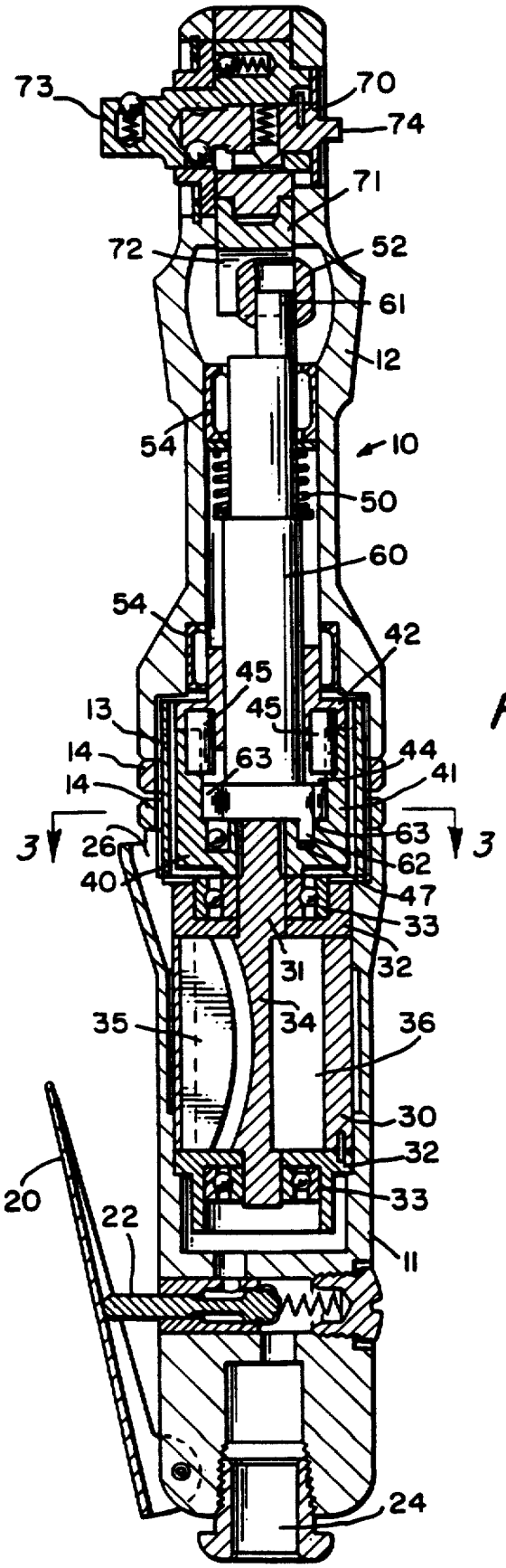
FIG. 1
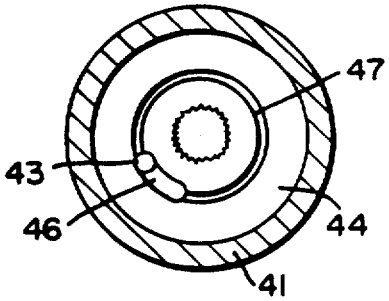
FIG. 3
FIG. 2
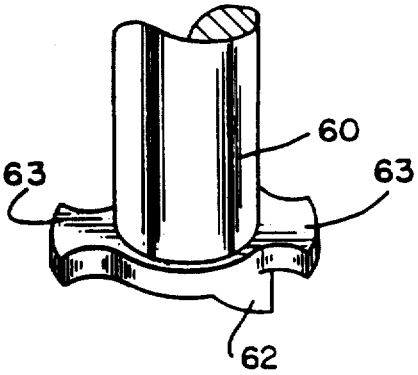

RATCHET WRENCH

Matter enclosed in heavy brackets [ ] appears in the original patent but forms no part of this reissue specification; matter printed in italics indicates the additions made by reissue.

This application is a continuation of application Ser. No. 07/188,143, filed Apr. 29, 1988, which is a continuation of Ser. No. 06/861,540 filed May 9, 1986, both now abandoned.

FIELD OF THE INVENTION

This invention pertains to a powered ratchet wrench for tightening or removing threaded parts. An impact clutch mechanism connects the ratchet mechanism with a rotary power source.

BACKGROUND OF THE INVENTION

Conventional powered ratchet wrenches, such as that disclosed in Japanese utility model gazette No. 1976-16,555, have a motor operated by compressed air in the base of the housing. When a throttle lever is pressed, compressed air flows to the motor, and the output shaft of the motor turns a transmission shaft by way of speed reducing gears. Slow speed and high torque are transmitted to the transmission shaft. The eccentric rotation of a crankshaft at the front end of the transmission shaft oscillates a ratchet yoke. The movement of the ratchet yoke causes the ratchet spindle or tool head of a ratchet mechanism to rotate so that a bolt, nut, or other threaded part is tightened or removed.

In a conventional ratchet wrench, the gear drive continues to transmit motor torque directly to the operator even after the fastener has been tightened to a specified tightening torque. That is, if the throttle lever is held open after the fastener has been firmly tightened, compressed air continues to drive the motor and the gears, which in turn drive the transmission shaft and ratchet mechanism. Thus, a considerable reaction force is transmitted to the operator as the tool tries to rotate around the tightened, stationary fastener. The operator's hand can be jerked forward by the wrench, or the operator may lose his grip. Even if the operator quickly releases the lever as soon as tightening is finished a reaction force is still transmitted to the hand. It is difficult to prevent the hand from being pulled along or from losing its grip. Hence, the operator usually releases the lever before tightening is finished. The operator then turns the tool manually to finish tightening. The tightening force applied by these prior art tools can therefore be inconsistent.

In some situations, conventional powered ratchet wrenches are unsuitable for use in tight places where there is room for only one hand. Because the ratchet wrench cannot be gripped tightly in such cramped places, and since it is difficult to release the throttle lever at exactly the right time, the hand is often jerked or loses its grip. The operator's hand can be forcefully thrown against an obstruction and injured, or the ratchet wrench can forcefully strike a projecting part and be damaged.

There is therefore a need for a powered ratchet wrench which minimizes the motor torque reaction force transmitted to the operator. It is desirable to provide a powered ratchet wrench which minimizes the torque reaction force transmitted to the operator's hand so that the hand is not pulled along with the tool while the motor is still operating and torque is still acting on the fastener.

SUMMARY OF THE INVENTION

This invention provides a powered ratchet wrench such that, when used to tighten or remove a part or fastener, an impact clutch mechanism provides the connection between the tool motor and the ratchet mechanism. To tighten a fastener, the impact clutch mechanism provides an initial direct connection between the motor and the ratchet mechanism to set or snug-up the fastener during "run down". The ratchet mechanism is thereafter rotated by a series of rotational impacts delivered by the impact clutch. To remove a fastener, the impacts break the fastener loose, while the direct drive "runs up" the fastener. If the throttle lever is not released when fastener tightening is completed, only minimal torque reaction force is transmitted to the operator due to the impact clutch. Thus, the tool can preform consistent tightening quickly and reliably, without manual assistance.

More particularly, the ratchet wrench according to this invention is constructed so that the motor and ratchet mechanism are connected with an impact clutch rather than a speed reducing gear device, as in the conventional wrench. The impact clutch allows the ratchet mechanism to rotate either under direct motor power or by rotational impacts. An impact can be produced rapidly and extremely smoothly during each motor rotation, so that the threaded part can be firmly tightened by the ratchet. Thus, while the ratchet is tightening the part, and after the part is fully tightened, the connection between the motor and the ratchet is intermittently broken, so that the ratchet is rotating with minimum reaction to the operator.

Thus, if the throttle lever is not released when tightening is completed, only a minimal reaction force is transmitted to the operator. This allows complete tightening to be carried out consistently and reliably.

This wrench is also suitable for use in tight places with room for only one hand on the tool. The hand won't be thrown against the work piece and injured, as could happen previously. Also, the danger of the ratchet wrench striking an obstruction and being damaged is avoided.

BRIEF DESCRIPTION OF THE DRAWINGS

FIG. 1 shows a longitudinal cross section of the ratchet wrench.

FIG. 2 shows a perspective view of the base end of the anvil shaft, which is an essential part of the invention.

FIG. 3 shows a cross section along line III—III of FIG. 1, showing the hammer cage and cam ball of the impact clutch mechanism, which constitute essential parts of the invention.

DESCRIPTION OF THE PREFERRED EMBODIMENT

FIG. 1 shows a longitudinal cross section through a preferred embodiment of the ratchet wrench. The ratchet wrench 10 is constructed of several components which will first be described generally. A throttle lever 20 controls the air flow to a rotary air motor 30. The rotary output of the motor is transmitted to the hammer assembly 40 of an impact clutch mechanism. A spring 50 biases an anvil shaft 60 into association with the hammer assembly 40. The anvil shaft can be directly driven by the motor through the hammer assembly or can be driven intermittently by a series of rotational impacts from the hammer assembly. The rotation of a crank on the anvil shaft causes the reversible ratchet mechanism 70 to rotate in the desired direction, thus tightening or removing a threaded part or fastener. Only a small reaction force is transmitted by the tool to the operator once the fastener is tight.

More specifically the tool 10 includes a motor housing 11 and a ratchet housing 12, secured together in fixed relation such as by a threaded coupling ring 13 and coupling nuts 14.

A throttle lever 20 opens and closes a throttle valve 22. When throttle valve 22 is in the open position, compressed air enters the tool at air inlet 24 which is connected to a suitable compressed air source. The compressed air flows into the rotary air motor 30 and transfers its energy to the rotor. The spent air is exhausted from exhaust 26.

The rotary motor 30 is located in the motor housing 11. In the preferred embodiment, an air motor is shown, but any rotary power source such as a hydraulic or electric motor could also be used.

Air motor 30 has a rotor 34 and an extending output shaft 31. The two ends of rotor 34 are supported by bearings 33 which in turn are supported by end plates 32. The rotor is mounted for rotation in the cylinder 35, the open ends of which are covered by the end plates 32. The cylinder has an eccentric bore, as is typical of conventional air motors. A plurality of vanes 36 are slidably mounted in radial slots in the rotor. The vanes slide radially back and forth in the slots as the rotor turns due to centrifugal force and the eccentric inner surface of cylinder 35. As the inlet air pushes against vanes 36, it causes rotor 34 to rotate, thus causing output shaft 31 to rotate therewith.

Numeral 41 designates the hammer cage. It is cup shaped, having a cylindrical wall portion and a base portion which together form an inner surface designated by numeral 44. Within the hammer cage on the inner surface 44 are two diametrically opposed axial grooves. The axial grooves extend only part way down the cylindrical wall portion, forming semi-circular shoulders at a specified distance above the base portion. The hammer cage 41 in this preferred embodiments is directly driven by the output shaft 31, as for example by a splined connection. Alternatively, however, the hammer cage could be gear driven.

Formed in the base portion of the hammer cage is a circular raceway 47, which is concentric about the axis of rotation. Coinciding with the raceway, but extending for only a limited number of degrees, is a larger-dimensioned cam ball pocket 46. The cam ball pocket typically describes an arc in the range of 45 to 180 degrees. A cam ball 43 is held in the pocket and rolls freely through the arc.

The anvil shaft 60 carries an axially extending cam 62. The cam 62 is preferably a one-sided cam and projects axially from the end of the anvil shaft. The cam forms a cam peak with preferably one gradually rising inclined surface adjacent the cam peak and one sharply falling surface adjacent the other side of the peak. The inclined surface occupies about a 90 degree arc on the anvil shaft. The sharp surface facilitates escape of the cam. The cam 62 and the raceway 47 are dimensioned so that when the hammer cage rotates with the cam extending into the raceway, the hammer cage rotates freely without interference from the cam. In other words, as the raceway rotates relative to the cam, the raceway permits the cam to extend into it without interference.

The anvil shaft carries at least one, and preferably two anvil jaws 63. The anvil jaws are diametrically opposed and radially extending. The outer radial surfaces of the anvil jaws are dimensioned so that the inner chamber 44 of the hammer cage can rotate freely about the anvil jaws.

The anvil shaft also carries an eccentric crank 61 at the shaft end opposite the cam 62. The anvil shaft 60 is supported by needle bearing 54 so that it slides freely in the axial direction as well as freely rotates. The anvil shaft is also journaled for rotation and axial movement by a bore in hammer cage top 42.

Numeral 50 designates a helical coil biasing spring of a size to fit around a reduced diameter portion of the anvil shaft 60 and abut against a shoulder on the shaft. This biasing spring normally urges the anvil shaft 60 toward the base portion of the hammer cage 41, such that the extending cam 62 normally projects into the raceway 47.

At least one, and preferably two hammer jaws 45 are received in the axial grooves of the hammer cage 41. The hammer jaws are harden pins and when in place are half embedded in the cylindrical wall portion and half exposed in the inner chamber 44. The hammer jaws rest on the shoulders of the axial grooves so as not to extend to the base portion of the hammer cage. An uninterrupted cylindrical surface is provided below the shoulders at the base of the inner chamber 44. This surface allows the hammer cage 41 to rotate relative to the anvil jaws 63 when the biasing spring urges the anvil shaft toward the base portion of the hammer cage without impacting on the anvil jaws.

The hammer cage top 42 has a short, snug-fitting, reduced diameter portion that is inserted into the inner chamber 44 of the hammer cage. The cage top also has two diametrically opposite pilot bores that axially align with the axial grooves of the hammer cage. The hammer jaws 45 are also received into these pilot bores to fix the hammer jaws in an axial position and to lock the hammer cage and hammer cage top together against relative rotation.

FIG. 1 illustrates the ratchet wrench in a position when the biasing spring 50 is extended and the cam 62 is positioned in the raceway 47. The anvil jaws 63 are biased by the spring toward the base of the hammer cage such that during rotation of the hammer cage, the hammer jaws 45 do not intercept the anvil jaws 63. The uninterrupted cylindrical portion of the hammer cage 41, that portion located below the hammer jaws, rotates radially adjacent to the anvil jaws.

When the anvil jaws 63 move axially forward, due to the cam 62 riding up on cam ball 43 and compressing the biasing spring 50, the orbit of the rotating hammer jaws 45 intercepts the new position of the anvil jaws. When the cam 62 moves the anvil shaft axially forward during each rotation of the hammer cage, the hammer jaws 45 produce a series of rotational impact against the anvil jaws 63.

Eccentric crank 61 is positioned at the end of the anvil shaft 60 opposite the cam 62. The crank slides axially in the bore of a drive bushing 52 so as to allow for the axial movement of the anvil shaft.

Drive bushing 52 slides vertically in a bushing pocket 72 of ratchet yoke 71 so as to accommodate the up and down movement of the crank 61 as it rotates. The oscillating movement of the ratchet yoke is transferred to the ratchet mechanism 70. The ratchet mechanism rotates a ratchet spindle or tool head 73 in a conventional manner as is well known in the prior art.

By turning the ratchet reverse knob 74 to the appropriate setting, the direction of rotation of the ratchet spindle can be determined. The tool can be operated to tighten or remove a fastener by setting the ratchet reverse knob 74.

OPERATION

To set a threaded fastener, the ratchet mechanism is first simply directly driven by the motor through the impact clutch to rotate or "run down" the fastener to a snug position. Next, to fully tighten the fastener, impacts are applied by the impact clutch mechanism to further rotate the ratchet mechanism and further torque the fastener.

FIG. 1 illustrates the "run down" position of the tool. The anvil shaft 60 is in its normal axial position, that is biased toward the base portion of the hammer cage with the one-sided cam 62 extending into the raceway 47. The cam ball 43 is contained in the limited arc cam ball pocket 46. When the air motor rotates, output shaft 31 causes hammer cage 41 to rotate with it due to the splined connection. The trailing shoulder of the rotating cam ball pocket engages and drives the cam ball in the direction of rotation directly of the hammer cage. The cam ball next engages but does not roll up the inclined surface of the one-sided cam 62. The rotating cam ball imparts rotation to the anvil shaft 60. The rotation of the crank 61 at the end of the anvil shaft causes the ratchet mechanism to "run down" the fastener. Until the ratchet mechanism and the anvil shaft 60 encounter sufficient resistance from the fastener as it becomes snug, the motor is directly driving the ratchet mechanism through the cam ball of the impact clutch mechanism.

When the ratchet mechanism and the anvil shaft 60 encounter sufficient resistance, the gradual inclined surface of the cam 62 begins to ride up on the cam ball 43 due to the continued rotation of the cam ball with the hammer cage. The anvil shaft and the attached anvil jaws 63 are moved axially forward away from the base portion of the hammer cage. In other words, the cam ball cooperates with the cam to move the cam and attached anvil shaft axially forward as the cam rides up on the cam ball as it revolves within the cam ball pocket and rotates with the hammer cage.

When the cam peak overrides the top of the cam ball, the cam momentarily maintains its axial momentum and clears the cam ball, which continues to rotate beneath the cam. The cam is momentarily in "free flight" before an impact occurs. There are a few degrees of clearance between the trailing shoulder of the cam ball pocket and the hammer jaws. The anvil jaws 63 have been moved axially away from the hammer base portion and are now in an axial position which intercepts the orbit of the rotating hammer jaws 45. The exposed portions of the hammer jaws 45 intercept the new position of the anvil jaws and an impact is delivered to the anvil jaws.

This impact drives the anvil shaft 60 in the direction of rotation of the hammer cage until sufficient resistance is met. This resistance is the resistance the fastener encounters as it tightens and is transferred from the fastener through the ratchet mechanism to the anvil shaft 60. When sufficient resistance is met, the anvil shaft stops rotating and the hammer jaws and anvil jaws will begin to disengage.

At that time, the force in the compressed biasing spring 50 overcomes the axial momentum of the anvil shaft and begins to push the cam back towards the hammer cage base. As the cam peak moves toward the base, the steep escape surface adjacent the cam peak kicks the cam ball in the direction of the leading edge of the cam ball pocket. The cam peak then again enters the raceway 47.

As the hammer cage continues to rotate, the cam 62 once again encounters the cam ball 43. The cam ball rotates in the cam ball pocket with the cam until the ball reaches the trailing edge of the pocket. If there still is sufficient resistance due to fastener tension, the cam ball will again force the cam to ride up on the cam ball and the impact sequence will be repeated until the fastener can not be further tightened. The cam ball thus times the impacts. At ultimate tightening torque, the impact clutch mechanism will continue to cause the hammer to impact on the anvil. The ratchet mechanism will not provide any more tightening torque to the fastener. However, the tool operator will not experience any torque reaction due to the tool turning on the tightened fastener. Rather the operator will experience only the minimal reactions due to the impact clutch.

Other embodiments are considered to be within the scope of this invention. For example, anvil shaft 60 can be constructed of two pieces to facilitate the manufacture and assembly of the tool. A separate cam portion having the cam peak and anvil jaws can be positioned inside the inner chamber 44 of the hammer cage and splined to a shaft portion extending through the bore of the hammer cage top. Furthermore, biasing spring 50 can be positioned anywhere along the shaft portion of the anvil shaft 60. For example, in the embodiment with a two piece anvil shaft, the biasing spring can be positioned on the splined connection between the cam portion and the shaft portion.

The purpose of the impact clutch mechanism is to translate rotary motion to interrupted rotary motion having less torque reaction. The impact clutch mechanism described in connection with the preferred embodiment can be broadly categorized as a unique embodiment of a cam engage, spring disengage impact clutch. Other embodiments of the cam engage, spring disengage type impact clutch are also considered to be within the scope of this invention. For example, in the preferred embodiment, the anvil shaft moves axially. An alternate embodiment can provide for the hammer jaws to move axially rather than the anvil shaft.

Additionally, other types of impact clutch mechanisms, such as the cam engage, cam disengage impact clutch of Mauer (U.S. Pat. No. 3,661,217 issued May 9, 1972), and the spring engage, spring disengage impact clutch of Pott (U.S. Pat. No. 3,369,615 issued Feb. 20, 1968), are considered to be within the scope of this invention. The Pott impact clutch is particularly suitable for electric driven ratchet wrenches.

One advantage of this invention over the prior art includes minimizing the torque reaction to the tool operator when a fastener is tight and the tool continues to run. This allows the tool to be safely operated with one hand and also in confined and awkward situations. The tool will also produce a consistent tightening torque. The operator will not have to stop the tool before the fastener is tight and manually tighten the fastener out of concern for his own safety and well-being. Additionally, the tool allows a faster "run-down" of the fasteners than prior art powered ratchets.

From the foregoing, those skilled in the art will recognize the improvements over prior art tools and the considerable advantages.

Changes and modifications in the specifically described embodiments can be carried out without departing from the scope of the invention which is intended to be limited only by the scope of the appended claims.

I claim:

1. A powered ratchet wrench comprising, in axial alignment to form an elongated handle:

a rotary motor having a rotatable output shaft;

a rotary impact clutch mechanism also having a rotatable output shaft and rotated by said rotatable output shaft of said rotary motor;

a reversible ratchet mechanism having an oscillatable ratchet yoke and being oscillatably driven through said yoke by the output shaft of said impact clutch; and a single ended tool drive spindle driven by said ratchet mechanism and having its drive axis normal to the axes of said rotary motor and said impact clutch.

2. The powered ratchet wrench according to claim 1, wherein said impact clutch mechanism further comprises:

a rotatable hammer assembly connected to said output shaft of said rotary motor and arranged to drive an anvil member continuously at high speed under no load or low load conditions and to deliver a series of rotational impacts to said anvil member whenever the driven load exceeds a threshold torque level;

an output shaft on said rotatable anvil member adapted to convert the rotary output of the anvil to oscillatory movement of the ratchet yoke.

3. The powered ratchet wrench according to claim 2 wherein said impact clutch for delivering a series of rotational impacts comprises:

at least one hammer jaw disposed on and rotatable with said hammer assembly;

at least one anvil jaw disposed on and rotatable with said anvil member;

a spring for biasing said anvil jaw axially out of engagement with said hammer jaw; and a cam for repeatedly axially moving said anvil jaw into engagement with said hammer jaw to deliver a rotational impact to said anvil jaw.

4. A powered ratchet wrench for tightening or removing threaded fasteners, comprising:

a rotary motor having a rotatable output shaft;

a rotatable hammer cage coaxially connected to said output shaft for rotation therewith;

a rotatable anvil shaft coaxially supported with respect to said hammer cage and having a first end associated with said rotatable hammer cage;

at least one hammer jaw disposed on said hammer cage;

at least one anvil jaw disposed on said anvil shaft;

a spring axially biasing said anvil shaft so that said hammer jaw and said anvil jaw are axially out of alignment;

cam means associated with said anvil shaft for axially moving said anvil shaft so that said anvil jaw moves axially into alignment with said hammer jaw to deliver a series of rotational impacts to said anvil jaw;

an eccentric crank member fixed to a second end of said rotatable anvil shaft for eccentric rotation therewith;

means for converting the eccentric rotation of said crank member to substantially oscillating movement;

an oscillatable ratchet yoke operatively connected to said converting means; and a ratchet mechanism operated by the oscillating movement of said ratchet yoke and driving a ratchet spindle for tightening or removing threaded fasteners.

5. In a powered ratchet wrench, the combination of:

a rotary motor having a rotatable output shaft driven by said motor;

a rotatable hammer cage having a cylindrical wall portion and a flat base portion and coaxially connected at said base portion to said output shaft for rotation therewith;

a rotatable anvil shaft coaxially supported with respect to said hammer cage for rotational and axial movement and having a peak-shaped cam projecting axially from a first end;

at least one anvil jaw projecting radially from said first end of said anvil shaft;

an inner chamber in said hammer cage enclosing said first end of said anvil shaft and having a raceway in said base portion of said hammer cage to allow relative rotation of said cam;

a cam ball pocket coinciding with said raceway through a limited arcuate distant in said base portion of said hammer cage;

at least one hammer jaw disposed on an inner axial surface of said inner chamber of said hammer cage;

a disengaging spring axially biasing said anvil shaft toward said base portion of said hammer cage so that said hammer jaw and said anvil jaw are axially out of alignment;

a cam ball disposed in said cam ball pocket in the path of rotation of said cam for driving said anvil shaft when said hammer jaw and said anvil jaw are axially out of alignment and for axially moving said cam against the bias of said disengaging spring so that said anvil jaw moves axially into alignment with said hammer jaw to deliver a series of rotational impacts to said anvil shaft;

a crank fixed to a second end of said rotatable . anvil shaft for eccentric rotation therewith;

a drive bushing for converting the eccentric rotation of said crank to substantially oscillating movement;

an oscillatable ratchet yoke operatively connected to said drive bushing; and a ratchet mechanism operated by the oscillating movement of said ratchet yoke and driving a ratchet spindle for tightening or removing threaded fasteners.

6. A powered ratchet wrench comprising:

a rotary motor;

an impact mechanism axially aligned with and engaged with the output shaft of said rotary motor, said impact mechanism further comprising:

a hammer cage in rotary driven engagement with said motor output shaft and having at least one hammer jaw;

a rotatable and axially slidable anvil shaft axially aligned with and centered in the hammer cage and having at least one anvil jaw, one axially extending anvil cam, and an eccentric shaft output end;

an impact clutch means for causing intermittent engagement between the hammer jaw and the anvil jaw through the combined action of a biasing spring and the anvil cam to produce rotary impacts on the anvil output shaft; and a reversible ratchet mechanism having a single output spindle and a yoke in oscillating driven engagement with the output end of the anvil shaft.

* * * * *